United States Patent [19]

Hunter

[11] Patent Number: 4,457,173
[45] Date of Patent: Jul. 3, 1984

[54] MULTIFUNCTION SENSOR USING THIN FILM TRANSISTOR TRANSDUCERS

[75] Inventor: Joe S. Hunter, Huntsville, Ala.

[73] Assignee: The United States of America as represented by the Secretary of the Army, Washington, D.C.

[21] Appl. No.: 373,922

[22] Filed: May 3, 1982

[51] Int. Cl.$^3$ .................. G01P 15/14; G01P 15/08
[52] U.S. Cl. .................................. 73/510; 73/504; 73/517 R
[58] Field of Search .............. 73/504, 505, 510, 511, 73/516 R, 517 R, 517 A; 74/5 F, 5.6 D

[56] References Cited

U.S. PATENT DOCUMENTS

| | | | |
|---|---|---|---|
| 2,716,893 | 9/1955 | Birdsall | 73/504 |
| 3,273,397 | 9/1966 | Forward | 73/505 |
| 3,559,492 | 2/1971 | Erdley | 73/505 |
| 3,842,681 | 10/1974 | Mumme | 73/505 |
| 4,311,046 | 1/1982 | Pittman | 73/510 |

Primary Examiner—James J. Gill, Jr.
Assistant Examiner—John E. Chapman, Jr.
Attorney, Agent, or Firm—Robert P. Gibson; Anthony T. Lane; Robert C. Sims

[57] ABSTRACT

A multifunction sensor provides two axes of angular rate and two axes of linear acceleration information from a single instrument. The multifunction sensor utilizes an air bearing rotor to support the spinning transducers. Angular rate measurements are made by utilizing two thin film transistors mounted on the rotor and oriented to sense strain about axes in a first plane orthogonal to the rotor spin axis. The two transducers output signals are summed to provide common mode rejection. A second set of thin film transistors are mounted on the rotor in a second plane orthogonal to that of the first set of transistors and oriented to sense strain along the axes orthogonal to the rotor spin axis. Two axes of acceleration can be measured by integrating this output signal at the proper time using a clock frequency. Angular rate and linear acceleration signals may be extracted from the rotating member via slip ring contacts or inductive pickoffs. These AC signals are amplified and demodulated to provide voltages which are proportional to angular rate and linear acceleration.

5 Claims, 6 Drawing Figures

4,457,173

MULTIFUNCTION SENSOR USING THIN FILM TRANSISTOR TRANSDUCERS

DEDICATORY CLAUSE

The invention described herein may be manufactured, used, and licensed by or for the Government for governmental purposes without the payment to me of any royalities thereon.

BACKGROUND OF THE INVENTION

There are a number of interesting devices which have been designed to measure both angular rate and linear acceleration from a single instrument. One company has developed a Spin Coupled Accelerometer Gyro. This spin coupling technique employs a non-orthogonal suspension coupling of the rotor to the shaft, resulting in a specific mechanical coupling between the normal rotor motions about one of the rotating axes normal to the shaft and the shaft axis. The instrument is designed to be sensitive only to the sum of angular rate and linear acceleration inputs. The complexity of the Spin Coupled Accelerometer Gyro design results in a relatively expensive instrument. Another company has designed a multifunction sensor which makes use of a ballbearing rotor which carries piezoelectric acceleration transducers. This design, although relatively low in cost, suffers some from twice spin frequency bearing noise.

The simplicity of the present invention results in an instrument that is low in cost and the air bearing suspension results in an instrument that does not suffer from twice spin frequency bearing noise.

SUMMARY OF THE INVENTION

The apparatus of the present invention is a device for measuring two axes of angular rate and two axes of linear acceleration. Only two such devices are required to supply sufficient information to implement a basic strapdown missile guidance system.

The multifunction sensor utilizes an air bearing rotor to support spinning thin film transistor acceleration transducers. The angular rate information is based on measuring the Coriolis accelerations exerted on an elastically restained body which rotates at a high spin speed. The angular rate measurements are made by utilizing two thin film transistors mounted on the rotor and oriented to sense strain about axes in a plane orthogonal to the rotor spin axis. Common mode rejection is accomplished by summing the output signals from the two transducers. The basic output of the transducer configuration is an amplitude modulated signal at twice spin frequency. A second set of thin film transistors is mounted on the rotor and oriented to sense strain along the axis in a plane orthogonal to the rotor spin axis. Similarily, the basic acceleration output signal is an amplitude modulated signal at twice the wheel spin frequency.

DESCRIPTION OF THE PREFERRED EMBODIMENT AND BEST MODE

Figure 1A:
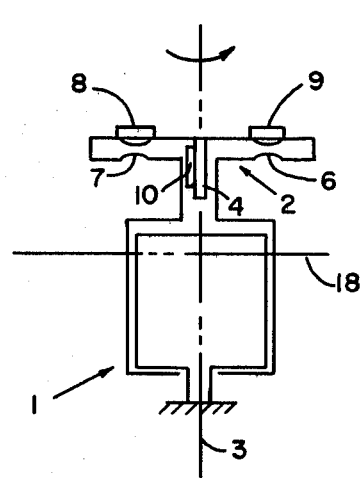
FIGS. 1A and 1B are a functional view of a multifunction sensor mounted on an air bearing.
Figure 1B:
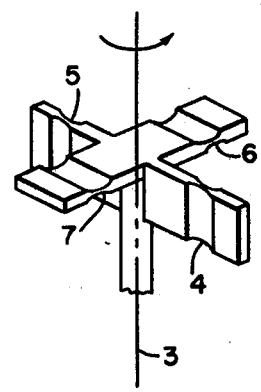
Figure 2:
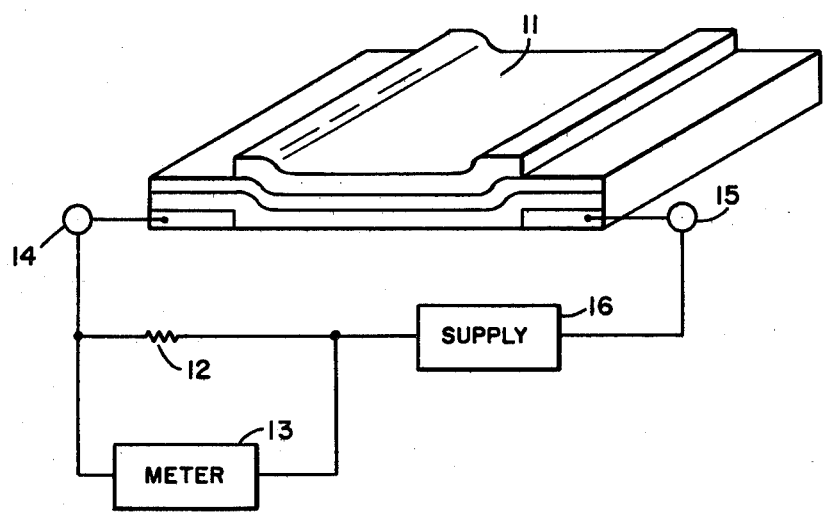
FIG. 2 depicts the thin film transistors used to sense strain.

Referring now to the drawings, there is disclosed a preferred embodiment of the invention in FIGS. 1, 2 and 3. In FIG. 1A an air bearing assembly 1 supports a rotor 2. The rotor 2 is driven about axis 3 in either a clockwise or counterclockwise direction. The rotor (rotating member) 2 is illustrated in a 3 dimensional view in FIG. 1B with a set of vertical flexure joints 4 and 5 and a set of horizontal flexure joints 6 and 7. Thin film transistors 8-11 are used to sense strain at flexure joints 4-7. When a stress is exerted on the gate 11 (FIG. 2) of the thin film transistor, the source drain current increases in direct proportion to the applied stress. This current is directed through rings 14 and 15 to a precision resistor 12 to provide a voltage at meter 13 which is proportional to the applied strain. The transistors 8-11 are shown larger than they are in FIG. 1A for illustration purpose.

Figure 3A:
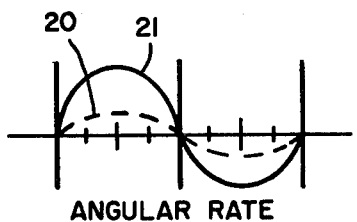
FIGS. 3A and 3B illustrate the output waveform from the multifunction sensor.
Figure 3B:
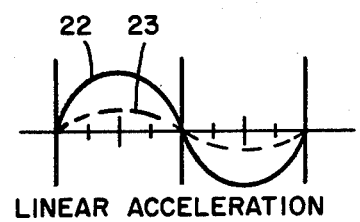

The multifunction sensor measures angular rate in the following manner. A pair of thin film transistors 8 and 9 are mounted over the horizontal flexure joints 6 and 7 in a manner that will allow a strain to be set up on the thin film transistors gate when the flexure joints are moved. With the rotating member 2 in steady state motion about the spin axis 3 there is substantially no A.C. output. With the rotating member 2 in motion, an angular rate input about axis 18 in the plane of the drawing (FIG. 1A) will cause the rotating member 2 to want to precess about an axis which is orthogonal to both the spin axis 3 and the axis 18 about which the disturbance is applied (i.e., about an axis orthogonal to the plane of the illustration in FIG. 1A). This will cause a strain on thin film transistors 8 and 9 mounted on flexure joints 6 and 7 and result in output waveform 21 (FIG. 3A).

The frequency of the waveform is equal to twice the rotor spin frequency. The doubling of the frequency is due to the fact that the transistor cannot detect the direction that the joints flex. They only detect the magnitude of the flexing. The angular rate information is based on measuring the Coriolis accelerations exerted on the elastically constrained rotating member which turns at high spin speeds. The amplitude of the output waveform can be varied by varying the rotating member spin rate or the disturbance rate. A reduced amplitude waveform 20 results when the spin rate of the disturbance rate is reduced. In actual application the spin rate will remain essentially constant, and the disturbance rate will be the variable. Therefore, the amplitude output can be calibrated in terms of the disturbance rate. It follows that disturbing the multifunction sensor about an axis orthogonal to axes 3 and 18 will result in an attempt to precess about the axis 18 in the plane of the paper. The instrument can, therefore, sense angular rates about two axes (axis 18 and the axis which is orthogonal to axis 3 and axis 18).

The multifunction sensor measures linear acceleration in the following manner: A pair of thin film transistors 10 and 11 are mounted over the vertical flexure joints 4 and 5 in a manner that will allow a strain to be set up on the thin film transistors gates when the flexure joints are exercised. With the rotating member 2 in motion about the spin axis 3, there is an output 23 (see FIG. 3B) that is sinusoidal and varies at twice the spin frequency due to supply 16. If the multifunction sensor is accelerated along an axis in the plane orthogonal to the spin axis 3, the amplitude of this sinusoidal waveform will increase. Conversely, if the acceleration level is reduced, the amplitude of the waveform 22 will be reduced. Measurement of acceleration in the plane orthogonal to the spin axis 3 provides two axes of linear acceleration. Two axes of acceleration can be measured in the second plane by integrating the output signal at the proper time using a clock frequency. Angular rate and linear acceleration signals may be extracted from the rotating member via slip ring contacts or inductive pickoffs. These AC signals are amplified and demodulated in a manner well known in the art to provide voltages which are proportional to angular rate and linear acceleration. See the U.S. Pat. Nos. 2,716,893 by Birdsall, Sept. 6, 1955 and 3,559,492 by H. F. Erdley, Feb. 2, 1971 for examples of known systems to determine these forces.

Figure 4:
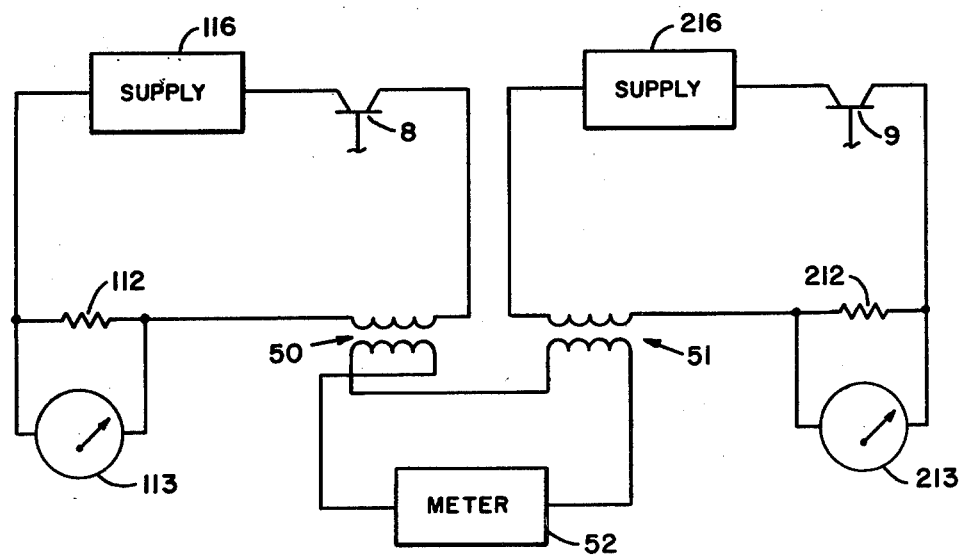
FIG. 4 shows a possible summing network.

In order to provide common mode rejection the outputs from pairs of transistors 8 and 9 or 10 and 11 are summed. Any of the well known summing circuits may be used such as that shown in FIG. 4. The outputs from transistors 116 and 216, resistors 112 and 212 are fed to primary windings of transformers 50 and 51. The outputs of transformers 50 and 51 (crossed connected to eliminate the 180° phase shift) are summed and sent to a meter 52.

A multifunction sensor will readily provide two axes of angular rate information and two axes of linear acceleration information. Utilization of an air bearing support will virtually eliminate the twice spin frequency bearing noise found in conventional ball bearing devices and improve overall performance significantly.

This invention is applicable to short to medium range missiles to provide low cost strapdown midcourse guidance to increase missile accuracy and extend range. Multifunction sensors provide a distinct cost and logistical advantage over single sensing instruments in that spare parts are required for only one type of instrument. Reliability is enhanced by concentrating on the design of a single instrument and in the reduction of pieceparts. The size and weight of guidance systems will also be reduced because of a reduction in parts count. The development of such a system will significantly reduce the life cycle cost by reducing instruments required for a 3 axis system from a maximum of six (three gyros and three accelerometers).

I claim:

1. A rotating body which rotates at a high speed about a first axis, the improvement comprising a first flexible joint mounted on said body in a first plane orthogonal to said first axis whereby acceleration of said body will cause said flexible joint to flex; a first transducer mounted in said flexible joint so as to detect at its output the amount of strain in said flexible joint caused by said acceleration; first measurement means connected to said first transducer for measuring said acceleration; a second flexible joint mounted on said body in a second plane which is orthogonal to said first plane; a second transducer connected to said second joint so as to detect at its output the amount of strain in said second joint caused by acceleration of said body; and second measurement means connected to said second transducer for measuring the output of said second transducer.

2. A device as set forth in claim 1 wherein said first flexible joint is mounted in a horizontal plane relative to said first axis; and said second flexible joint is mounted in a vertical plane relative to said first axis.

3. A device as set forth in claim 1 or 2 wherein said transducers are thin film transistors which vary their outputs in accordance to strain exerted on the transistors.

4. A device as set forth in claim 2 further comprising a third flexible joint mounted in the plane of said first flexible joint on the other side of said axis; a fourth flexible joint mounted in the plane of said second flexible joint on the other side of said axis; third and fourth transducers mounted in said third and fourth flexible joints respectively for measuring the strain on these joints; and said measurement means summing outputs of said first and third transducers and said second and fourth transducers respectively so to provide common mode rejection.

5. A device as set forth in claim 1 or 4 wherein said body is rotated in an air bearing suspension system.

* * * * *